Patented Sept. 11, 1934

1,972,905

UNITED STATES PATENT OFFICE 1,972,905

COATING COMPOSITION AND METHOD OF MAKING THE SAME

Israel Rosenblum, Jackson Heights, N. Y.

No Drawing. Application January 2, 1931,
Serial No. 506,299

13 Claims. (Cl. 134—26)

The present invention relates to coating compositions and has for its object to produce a coating composition employing China wood oil as the vehicle and particularly suitable for the manufacture of white baking enamels.

Wood oil which is to be used as a vehicle for enamels, paints, varnishes, etc. must be heated to about 585° F. for some time to make it gas and draft proof. By "gas proof" is meant the capacity of a film containing such oil not to crystallize or crinkle or flatten in the presence of foul air, such as air containing an unusually large proportion of carbon dioxide or carbon monoxide; while a "draft proof" vehicle is one which will not craze or crystallize when a draft of air strikes the film before it becomes dry.

It is usually very difficult to make China wood oil gas proof as the oil must be made to polymerize to only a limited extent. If the oil is heated alone to about 585° F. it is difficult to control the polymerization and keep the same from gelling completely, in which event it becomes practically useless. If the oil is heated at a lower emperature it is not made completely gas or draft proof.

It is already known to render wood oil gas proof by adding thereto a gum composed of phthalic acid, glycerol and rosin, this gum acting to arrest the complete gelling of the oil when the mixture is heated to about 585° F. In this process, however, it is necessary to heat the mixture for a comparatively long time (which may be as much as two hours) in order to make the mixture gas proof. This prolonged heating is, however, objectionable because the oil partially decomposes and darkens in color, there being formed acids which displace the weaker phthalic acid of the gum, the phthalic acid volatilizing and being lost in great quantity. In such known process the amount of phthalic acid contained in the gum was usually about 20% by weight of the rosin present. The phthalic acid content usually should not go above 40% by weight of the rosin as otherwise the gum becomes insoluble in wood oil.

The present invention has for one of its objects to provide an improved process for the gas and draft proofing of wood oil and to produce a novel composition of matter capable of producing white coatings on various surfaces including tin and tin plate.

According to my improved process, the wood oil is first quickly heated, say, in about 12 to 15 minutes, to a temperature of about 480° F. and there is then introduced into the heated oil an ester gum, preferably an acidic gum, of comparatively high acid value, such as one made from colophony or from mixtures of colophony and fossil resins, and containing ¼ to ½% of a metallic oxide, preferably a zinc oxide in the form of zinc rosinate, the amount being based on the weight of the gum introduced. The zinc compound appears to restrain the gelling of the oil and the latter can be safely heated to 585° F. and kept there until the wood oil is gas and draft proof, which usually requires about 5 minutes, with very little danger of over-polymerizing the oil. Wood oil treated in this way can be kept for a long time at higher temperatures without becoming rubbery or too highly gelled and I ascribe this unexpected behavior to the presence of the zinc compound. In the manner just described I am able to produce a 40 gallon varnish that is, one having 40 gallons of oil to 100 pounds of gum.

After the oil has been heated to the gas proofing temperature in the presence of the neutral or acidic gum containing the zinc compound, there is added a resinous material containing enough basic radicals to neutralize the acidic ester gum, and the heating is continued until neutralization of the acidic gum by the hydroxylated resinous material has taken place, the reaction usually being complete when the acid number of the product falls to about 10 or below. If the gum used in the heating of the wood oil is substantially neutral, the hydroxyls contained in the later added resinous material condense so that a substantially neutral product is obtained. As the resinous material I prefer to employ a basic hydroxyl-containing condensate of a polyhydric alcohol, one or more polybasic carboxylic acids, and one or more acids obtained by hydrolysis of a drying or non-drying oil or of a fat, such as the more or less plastic complex esters containing free hydroxyls produced by the reaction of an excess of a polyhydric alcohol such as glycerol, phthalic acid, maleic acid (or malic acid, malomalic acid) linoleic acid or similar acid obtainable from a drying or non-drying oil, a fat or wax, to which may be added one or more acidic materials, taken from the group including phenol-aldehyde condensates, (particularly phenol-formaldehyde-zinc compound complexes), other acids derived from drying, semi-drying and non-drying oils and from fats, natural resins (fresh or fossil) etc., as described in my copending application Serial No. 506,298 filed Jan. 2, 1931.

By proceeding in the manner outlined above

I avoid the loss of phthalic acid, first, because the wood oil has been rendered gas and draft proof before the addition of the complex esters containing phthalic acid, and secondly, because the reaction is accelerated. There are thus formed very pale products which are uniform in quality and hold their color on baking so that there are produced, with white pigments, very white coatings which are strongly adhesive.

In place of the acidic ester gum I may use a natural resin (either fresh or fossil or mixtures thereof), which has been treated or hardened with zinc oxide or other suitable metallic oxide, such as calcium oxide, magnesium oxide, strontium oxide, etc., or their compounds. In this case the zinc compound, calculated as zinc oxide, may amount to 1% of the resin and I can make an 80 gallon varnish (i. e. one containing 100 pounds of the zinc treated resin to 80 gallons of oil) which is thoroughly gas and draft proof in character. To this mixture, I then add a quantity of the resinous material above referred to and containing free hydroxyls such that after continued heating and resulting esterification, a product is obtained which has an acid number of about 10 or below. I thus produce a gas and draft proof "long" oil varnish, that is, one having a large proportion of oil as compared with the gum content, it being understood that the longer the varnish the more difficult it is to make the same gas and draft proof.

In order that my invention may be better understood I shall describe the same with the aid of the following examples, but it is to be understood that these examples are given by way of illustration only and are in no way to be regarded as limiting the scope of the invention.

*Example 1.*—19 gallons of wood oil are heated rapidly (in, say, 10 minutes) to approximately 450° F. 54 lbs. of an acid ester gum, produced from colophony and an amount of glycerol insufficient completely to neutralize the colophony and containing ¼% of zinc oxide, are then added and the temperature raised to 585° F. The mass is kept at this temperature until a sample removed therefrom is stringy (which usually requires about three minutes). The reaction vessel is then removed from the fire and there are added 88 lbs. of, for example, an hydroxylated complex ester comprising the reaction product of phthalic acid, maleic acid, linoleic acid, colophony and an excess of glycerol obtained by heating the mixture of these substances at 190° C. for about half an hour and then heating at about 230° C. until a clear mass soluble in toluol is obtained (as described in my copending application Serial No. 506,298 filed Jan. 2, 1931), and the temperature is then maintained at about 500° F. until a sample removed from the vessel is clear. The reaction product may then be dissolved in a suitable solvent and a very small amount of a known drier, such as the oleate, linoleate, etc. of cobalt, lead, manganese, etc. may be added.

The reaction product obtained as above described is gas and draft proof and produces on baking a very white enamel when a white pigment is incorporated therewith.

In place of the zinc compound, I may use the corresponding compounds of other metals, such as, calcium, magnesium, strontium, barium, etc., but I have found that best results are obtained with a zinc compound. The compound may be the oxide (which is converted to the resinate by any acidic resin present), the abietate, the linoleate, the oleate, the acetate, or any other, preferably organic, compound, particularly of an acid present in a natural resin or synthetic (e. g. phenol-formaldehyde) resin, or obtainable by hydrolysis of a drying or non-drying oil, or of a fat or wax.

In place of the glycerol ester above mentioned, I may employ any of the other complex esters described in my said copending application Serial No. 506,298, such as the ester produced by heating first at about 190° C. for half an hour and then at 230° C. a mixture of 300 parts of phthalic acid, 300 parts of glycerol, 300 parts of linoleic acid, 15 parts of maleic acid, and 300 parts of a phenol-aldehyde-organic salt complex dissolved in colophony obtained by condensing phenol and formaldehyde in the presence of a metal oxide, hydroxide or organic salt and in the presence also of colophony. Where, however, the condensate of a phenol and formaldehyde is employed, the product will not be suitable for white coating compositions because of the more or less dark color of such condensate. As set forth in the aforementioned application, where maleic or equivalent acid is used in conjunction with glycerol, phthalic acid and an oil or fat acid and is heated simultaneously therewith, the amount of maleic acid must be limited to a maximum of about 15% by weight of the phthalic acid to avoid the formation of two immiscible layers which cannot be made to fuse together on heating.

*Example 2.*—The procedure described in Example 1 is followed except that the acid ester gum produced from colophony and containing the zinc compound, is replaced in whole or in part by an equivalent amount of a zincated acid ester gum derived from a fossil resin of any suitable type such as congo, manila, kauri, copal, etc.

*Example 3.*—19 gallons of wood oil are heated in the presence of a zinc-containing glycerol rosin ester having a zinc content, calculated as zinc oxide, of about ½% by weight of such ester, the quantity of ester employed being such as to produce a 60 gallon varnish (i. e. one containing 100 lbs. of gum to 60 gallons of oil). The temperature is kept at 585° F. until a sample removed from the reacting mass is stringy. There is then added an hydroxyl containing condensate of phthalic acid, maleic acid, glycerol, and acidic phenol-formaldehyde condensate, and colophony, as described in Example 1, or any of the other hydroxylated complex esters described and claimed in my above mentioned copending application Serial No. 506,298, in such proportion as to produce, as desired, a 40, 30, 20, or 10 gallon wood oil varnish. The temperature is reduced to about 500° F. and the mass kept at such temperature until a sample proves to be clear. The reaction mass may then be thinned with any suitable solvent. The resinous varnish or vehicle so obtained is gas and draft proof and produces a tough elastic film which adheres tenaciously to smooth metallic surfaces.

*Example 4.*—Thirty gallons of wood oil are heated rapidly to approximately 450° F., and there are then added 100-lbs. of a zincated rosin ester (e. g. rosin treated with zinc oxide or hydroxide and esterified with glycerol) containing an amount of zinc corresponding to ¼% by weight of the ester, calculated as zinc oxide. The temperature is then raised to 585° F. and the heating is continued until a sample taken from the mass is stringy. 340-lbs of a resin obtained by heating together 300 parts of glycerol, 150

300 parts of phthalic acid, 15 parts of maleic acid and 300 parts of stearic or ricinoleic acids, are added and the heating continued at about 500° F. for about 10 minutes. The product may then be thinned with a suitable solvent and a drier added thereto.

While I have specified the use of zinc compounds in the above examples, it is to be understood that compounds of other metals may be employed, particularly of the other metals of the second group of the periodic system. Also any of the complex hydroxylated esters described in my said copending application may be incorporated in the gas and draft proof wood oil prepared as above.

All of the final reaction products described above are characterized by extraordinary adhesiveness, but those which contain a phenolaldehyde condensate can not usually be employed for white baking enamels as they are generally darker than the products which are free of such condensate.

It will be understood that the soluble phenolaldehyde condensates above referred to may be produced from phenol, resorcinol, cresol, naphthol and other condensed nucleus phenols, their derivatives and substitution products, and from formaldehyde, acetaldehyde or other aldehyde or carbonyl containing compounds such as the ketones, but soluble condensates produced from ordinary phenol (carbolic acid) and formaldehyde are the most common and are at present preferred by me. By "soluble" I mean, of course, in the solvents usually employed for these substances, and not necessarily in water.

A "phenol-formaldehyde-zinc compound complex" such term is to be understood to mean a resinous material produced by the condensation of a phenol and formaldehyde in the presence of an oxide or hydroxide or organic salt of zinc (such as the acetate, abietate, benzoate etc.). Such compound is preferably produced in the presence of a natural resin, as described in my United States Patent No. 1,808,716. The term "maleic acid" is to be understood to include the equivalent polycarboxylic aliphatic acids.

Variations from the specific proportions and conditions herein indicated may be resorted to within the scope of the appended claims without departing from the spirit of the invention.

I claim:

1. The method of producing a coating material suitable for white baking enamels, which comprises first heating wood oil to a gas-proofing temperature in the presence of an acidic resin and of a small proportion of a zinc compound until the oil is substantially gas and draft proof, and then adding thereto the basic hydroxyl-containing reaction product of glycerol, phthalic acid, a monobasic acid obtained by hydrolysis of a drying oil and maleic acid, said reaction product containing sufficient hydroxyls to neutralize the acidic resin, and continuing the reaction until a substantially neutral product is obtained.

2. The method of producing a coating material suitable for white baking enamels, which comprises heating wood oil in the presence of a partially esterified natural resin and of a small proportion of a zinc compound until the oil is substantially gas and draft proof, and then adding thereto the basic hydroxyl-containing reaction product of glycerol, phthalic acid, linoleic acid, and maleic acid, and continuing the reaction until a substantially neutral product is obtained.

3. The method of producing a coating material suitable for white baking enamels, which comprises heating wood oil in the presence of a partially esterified natural resin and of a small proportion of a zinc compound until the oil is substantially gas and draft proof and then adding thereto the basic hydroxyl-containing reaction product of glycerol, phthalic acid, linoleic acid maleic acid, and boric acid, and continuing the reaction until a substantially neutral product is obtained.

4. The method of producing a coating material suitable for baking enamels, which comprises heating wood oil in the presence of a partially esterified natural resin and of a small proportion of a zinc compound until the oil is substantially gas and draft proof and then adding thereto the basic hydroxyl-containing reaction product of glycerol, phthalic acid, linoleic acid, maleic acid, and a phenol-formaldehyde-zinc compound complex, and continuing the reaction until a substantially neutral product is obtained.

5. The method of producing a coating material suitable for white baking enamels, which comprises heating wood oil in the presence of a partially esterified natural resin and of a small proportion of a zinc compound until the oil is substantially gas and draft proof, and then adding thereto the basic hydroxyl-containing reaction product of glycerol, phthalic acid, linoleic acid, maleic acid, and a natural resin, and continuing the reaction until a substantially neutral product is obtained.

6. The method of producing a coating material suitable for white baking enamels, which comprises first heating wood oil to a gas-proofing temperature in the presence of an acidic natural resin and of an organic compound of a metal of the second group of the periodic system, and then adding thereto the reaction product of a polyhydric alcohol, phthalic acid, a monobasic acid obtained by hydrolysis of a material selected from the group consisting of drying and non-drying oils and fats, and maleic acid, such reaction product containing free hydroxyl groups, and continuing the reaction until the acid number has fallen to approximately 10.

7. The method of producing a coating material suitable for white baking enamels, which comprises first heating wood oil to a gas-proofing temperature in the presence of an acidic natural resin and of an organic zinc compound, and then adding thereto the reaction product of a polyhydric alcohol, phthalic acid, a monobasic acid obtained by hydrolysis of a material selected from the group consisting of drying and non-drying oils and fats, and maleic acid, such reaction product containing free hydroxyl groups, and continuing the reaction until the acid number has fallen to approximately 10.

8. The method of producing a coating material suitable for white baking enamels, which comprises first heating wood oil to a gas-proofing temperature in the presence of an esterified natural resin and of a small proportion of a zinc compound, and then adding thereto the reaction product of a polyhydric alcohol, phthalic acid, a monobasic acid obtained by hydrolysis of a material selected from the group consisting of drying and non-drying oils and fats, and maleic acid, such reaction product containing free hydroxyl groups, and continuing the heating at a lower temperature until a homogeneous product of the desired consistency is obtained.

9. A substantially gas and draft-proof wood oil coating composition obtainable by heating wood oil at gas-proofing temperature with an acidic natural resin, and then reacting the resulting acidic gas and draft-proof oil with a hydroxyl-containing condensate of a polyhydric alcohol, phthalic acid, maleic acid, and a monobasic aliphatic acid obtained by hydrolysis of a material selected from the group consisting of drying and non-drying oils and fats, said composition having an acid number of approximately 10 or below.

10. A substantially gas and draft proof wood oil coating composition obtainable by heating wood oil at gas-proofing temperature with an acidic natural resin and a zinc compound, and then reacting the resulting acidic gas and draft-proof oil with a hydroxyl-containing condensate of glycerol, phthalic acid, maleic acid, and an unsaturated fatty oil acid, said composition having an acid number of approximately 10 or below.

11. A substantially gas and draft proof wood oil coating composition obtainable by heating wood oil at gas-proofing temperature with an acidic natural resin and a zinc compound, and then reacting the resulting acidic gas and draft-proof oil with a hydroxyl-containing condensate of glycerol, phthalic acid, maleic acid, boric acid, and an unsaturated fatty oil acid, said composition having an acid number of approximately 10 or below.

12. A substantially gas and draft proof wood oil coating composition obtainable by heating wood oil at gas-proofing temperature with an acidic natural resin and a zinc compound, and then reacting the resulting acidic gas and draft-proof oil with an hydroxyl-containing condensate of glycerol, phthalic acid, maleic acid, and linoleic acid, said composition having an acid number of approximately 10 or below.

13. A substantially gas and draft proof wood oil coating composition obtainable by heating wood oil at gas-proofing temperature with an acidic natural resin and a zinc compound, and then reacting the resulting acidic gas and draft-proof oil with an hydroxyl-containing condensate of glycerol, phthalic acid, maleic acid, an unsaturated fatty oil acid, and an acidic phenol-aldehyde-metal compound condensate, said composition having an acid number of approximately 10 or below.

ISRAEL ROSENBLUM.